United States Patent
Hessler et al.

(10) Patent No.: US 6,798,748 B1
(45) Date of Patent: Sep. 28, 2004

(54) ENHANCED MULTIFRAME ALIGNMENT FOR TANDEM CONNECTION TRIALS

(75) Inventors: Peter Hessler, Bavaria (DE); Manfred Alois Loeffler, Igensdorf (DE); Jurgen Leonhard Milisterfer, Rosstal (DE); Maarten Petrus Joseph Vissers, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 753 days.

(21) Appl. No.: 09/655,249

(22) Filed: Sep. 5, 2000

(30) Foreign Application Priority Data

Sep. 7, 1999 (EP) .............................................. 99307104

(51) Int. Cl.[7] .................................................. H04J 3/16
(52) U.S. Cl. ...................................... 370/242; 370/907
(58) Field of Search ................................ 370/241, 242, 370/243, 244, 245, 250, 539, 907

(56) References Cited

U.S. PATENT DOCUMENTS 4,987,568 A    1/1991   Shinada et al. ............... 370/15
5,555,248 A    9/1996   Sugawara .................... 371/5.1
6,452,906 B1 * 9/2002   Afferton et al. ............. 370/242

FOREIGN PATENT DOCUMENTS

DE        196 16286 A1   10/1997   ........... H04L/12/50

OTHER PUBLICATIONS

"EN 300 417–1–1 v1.1.2" European Standard (Telecommunications Series) ETSI. Nov. 1998. pp. 1–112.*
Choi, DooWhan. "Frame Alignment in a Digital Carrier System—A Tutorial". IEEE. Feb. 1990. pp. 47–54.*
European Search Report, dated Mar. 6, 2000.

* cited by examiner

Primary Examiner—Chi Pham
Assistant Examiner—Derrick W Ferris

(57) ABSTRACT

According to the invention a synchronous hierarchic network system and a method of transmitting data are disclosed using at least a path segment between a first network element and at least a second network element on which a tandem connection monitoring method is established for monitoring information over said path segment, and means for minimizing the signal interruption due to a loss of multiframe alignment subsequent to an interruption, distortion or switching operation of the signal transmission path.

10 Claims, 7 Drawing Sheets

State diagram 'Adapted Multiframe Alignment Process'

Figure 1:
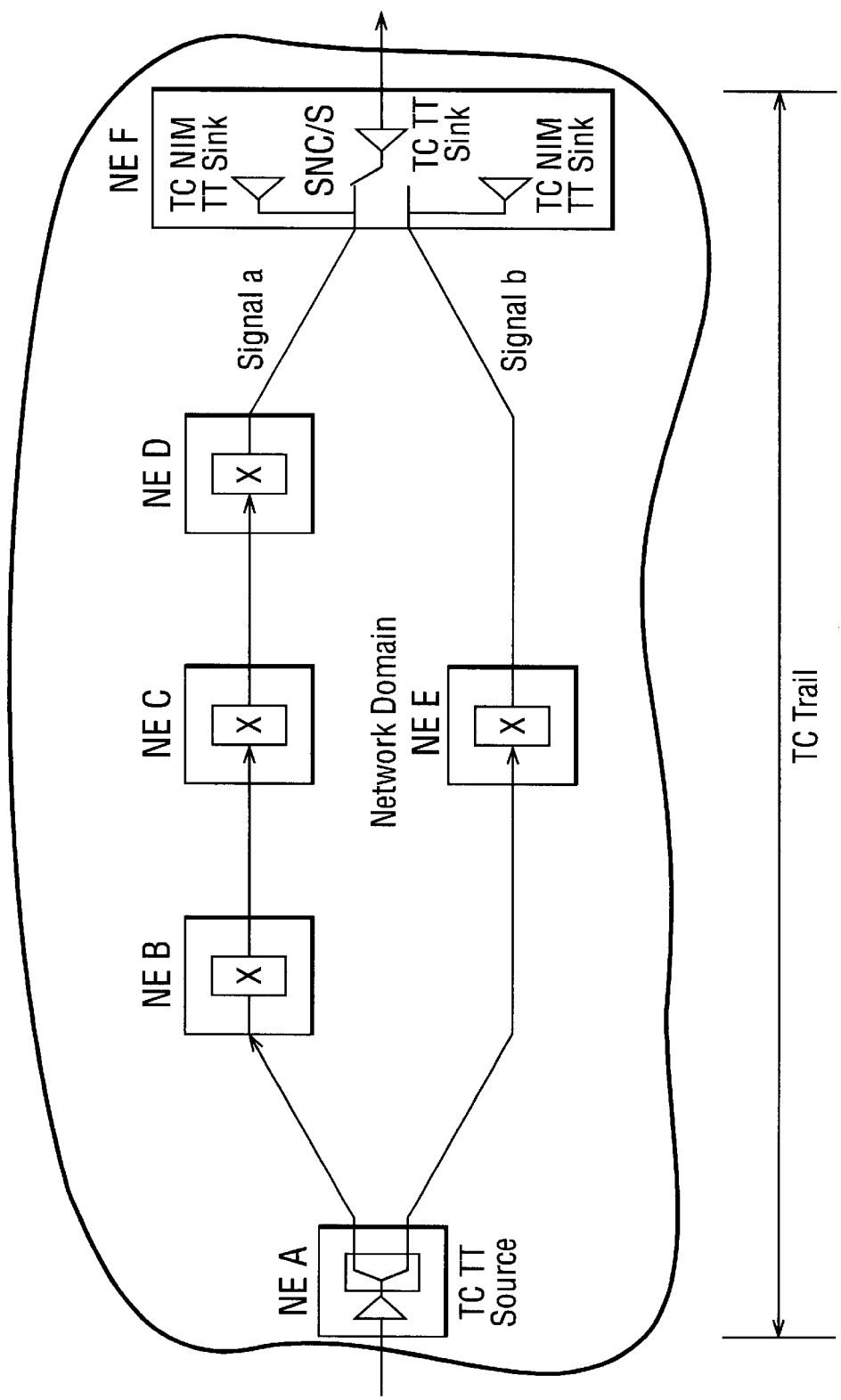

A: FAS found   B: FAS found   C: missing FAS at presumed position   D: missing FAS FIG. 1 Network with SNCP inside TC Trail

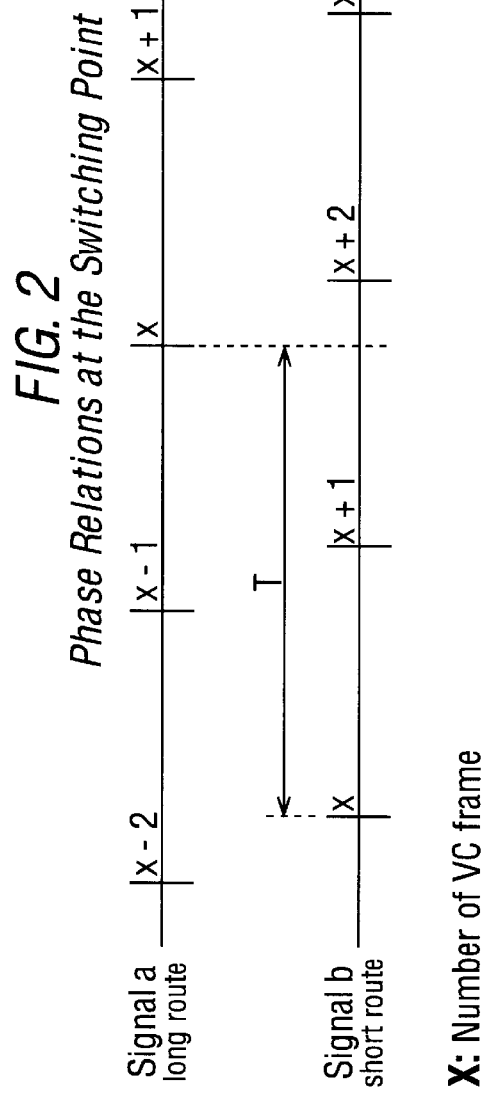
FIG. 2
Phase Relations at the Switching Point
X: Number of VC frame
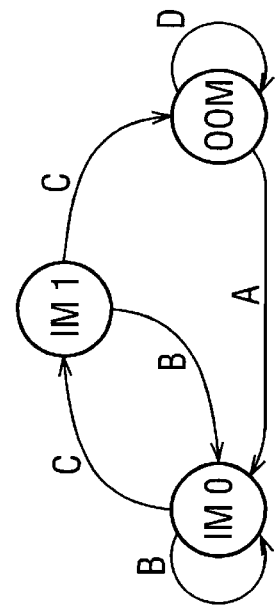
FIG. 3 State diagram 'Multiframe Alignment Process', current implementations
A: FAS found  B: FAS found at presumed position  C: missing FAS at presumed position  D: missing FAS

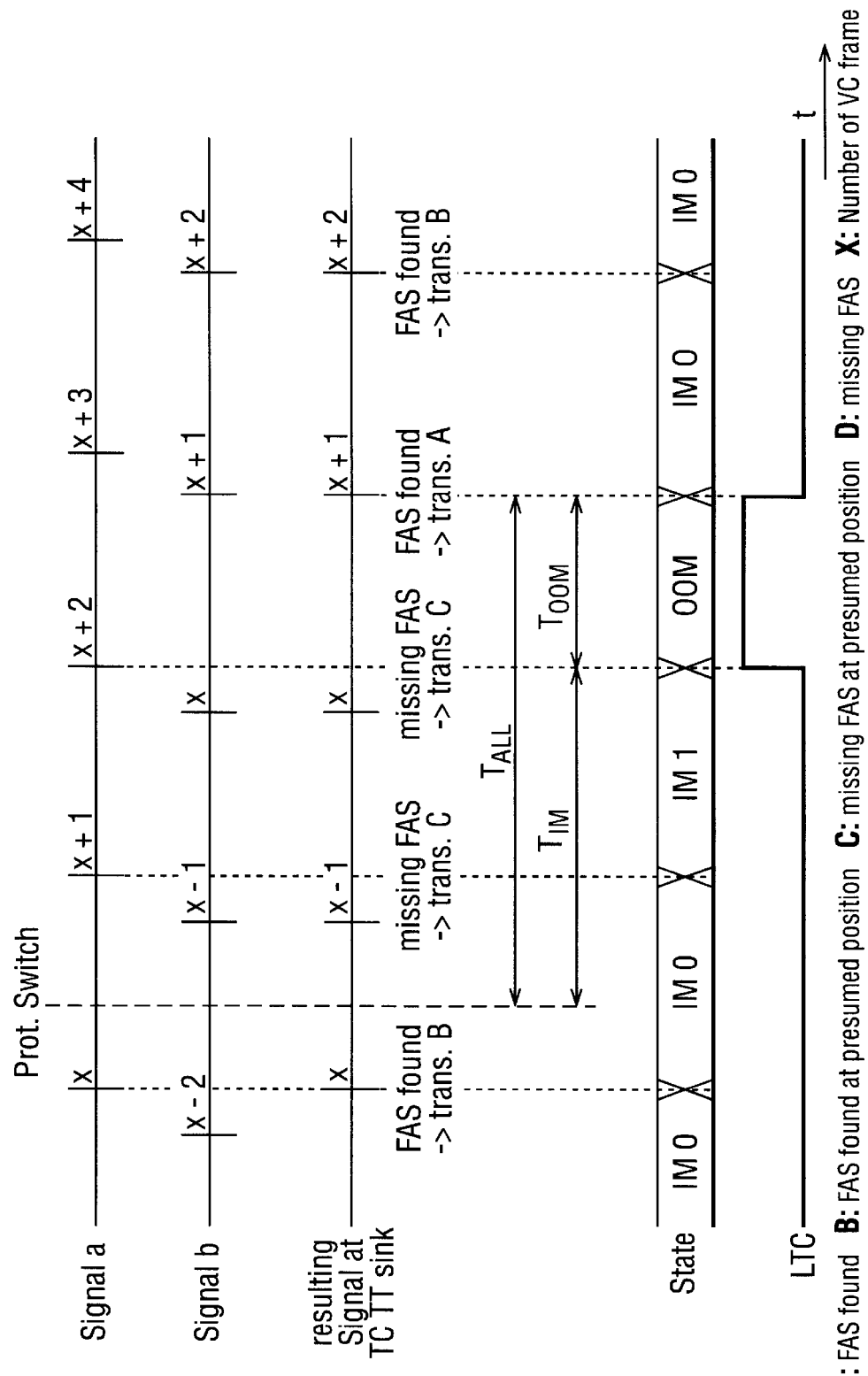
FIG. 4 Dependencies between state transitions
A: FAS found  B: FAS found at presumed position  C: missing FAS at presumed position  D: missing FAS  X: Number of VC frame State diagram 'Adapted Multiframe Alignment Process'

A: FAS found  B: FAS found  C: missing FAS at presumed position  D: missing FAS

FIG. 7
N1/N2 byte bit 7 - bit 8TC multiframe structure

| Frame # | Bits 7 and 8 definition |
|---|---|
| 1-8 | Frame alignment signal: 1111 1111 1111 1110 |
| 9-12 | TC-TTI byte #0 ($1C_1C_2C_3C_4C_5C_6C_7$) |
| 13-16 | TC-TTI byte (TC-API character) #1 (0XXXXXXX) |
| 17-20 | TC-TTI byte (TC-API character) #2 (0XXXXXXX) |
| .. | .. |
| .. | .. |
| .. | .. |
| 65-68 | TC-TTI byte (TC-API character) #14 (0XXXXXXX) |
| 69-72 | TC-TTI byte (TC-API character) #15 (0XXXXXXX) |
| 73-76 | TC-RDI, ODI and Reserved (see next table) |

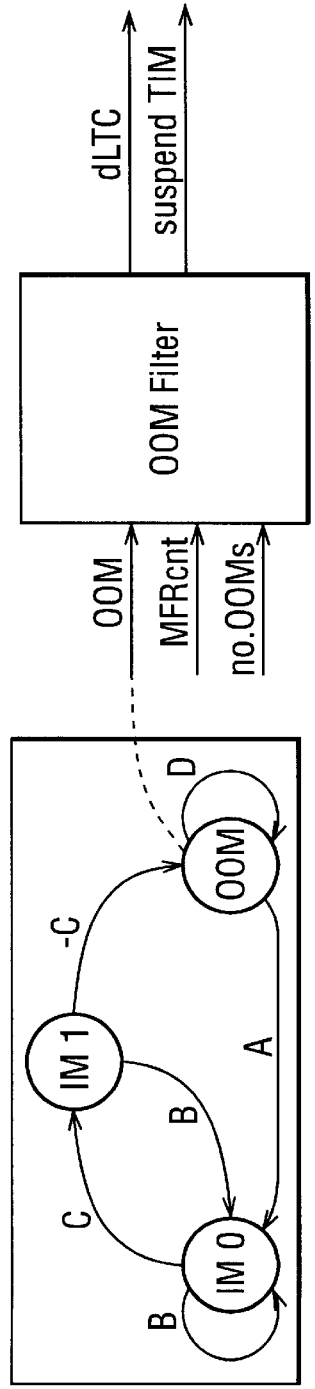

FIG. 8
Structure of frames #73 – #76 of the bit 7 – bit 8 of TC multiframe

| Frame # | TC-RDI, ODI and reserved capacity | |
|---|---|---|
| | bit 7 definition | bit 8 definition |
| 73 | Reserved (default = "0") | TC-RDI |
| 74 | ODI | Reserved (default = "0") |
| 75 | Reserved (default = "0") | Reserved (default = "0") |
| 76 | Reserved (default = "0") | Reserved (default = "0") |

FIG. 9 Block Diagram 'OOM Filtering'

A: FAS found  B: FAS found at presumed position  C: missing FAS at presumed position  D: missing FAS
MFRcnt: Trigger for Multiframe count  no.OOMs: provisioning for number of OOM multiframes until dLTC is set

ENHANCED MULTIFRAME ALIGNMENT FOR TANDEM CONNECTION TRIALS

CROSS-REFERENCE TO RELATED APPLICATION

This application claims priority of European Patent Application No. 99307104.2, which was filed on Sep. 7, 1999.

FIELD OF THE INVENTION

The invention relates to multiframe alignment in general and especially to a multiframe alignment for tandem connection trails at Non Intrusive Monitoring (NIM) Trail Termination (TT) sink functions and for TT sink functions in a Synchronous Digital Hierarchy (SDH) and Synchronous Optical Network (SONET) system.

BACKGROUND

The problem addressed with this invention typically arises in Synchronous Digital Hierarchy (SDH) and Synchronous Optical Network (SONET) systems in cases of protection switches within a Tandem Connection Trail. For a better understanding of SDH and SONET systems, reference is made to "Understanding of SONET/SDH", ISBN 0-9650448-2-3, Andan Publisher, New Jersey.

In the before-mentioned network system a tandem connection is intended to provide an administrative monitoring domain which is operating independent of the end to end path. Rules for the establishment of a tandem connection trail are defined in ETSI EN 300 417-4-1 and ITU-T G.783.

The operation and also the establishment of a tandem connection trail shall influence the rest of the network system as less as possible. Under certain circumstances (i.e. if switching actions are performed within a tandem connection trail), current Tandem Connection Monitoring (TCM) implementations according to the current versions of the standards unnecessarily enlarge signal disturbances.

Accordingly, there is a need to reduce the influence of protection switches within a tandem connection trail in a Synchronous Digital Hierarchy (SDH) or in a Synchronous Optical Network (SONET) System by avoiding enlargements of signal disturbances caused by protection switches.

SUMMARY OF THE INVENTION

Detecting an aligned signal reception or an in multiframe signal transmission state subsequent to an interruption, distortion or switching operation of the signal transmission path on the basis of any received frame alignment signal (FAS) value avoids any undue interruption of the signal transmission caused by the insertion of all one's while searching for the received frame alignment signal (FAS) only at a predetermined position.

If consequently a "FAS found at presumed position" signal is replaced by a "FAS found" signal and generated regardless of the position of a detected multiframe alignment signal and every detected multiframe alignment signal (FAS) is accepted as a valid frame alignment signal (FAS) then the shortest realignment time periods are realized.

BRIEF DESCRIPTION THE DRAWINGS

Figure 5:
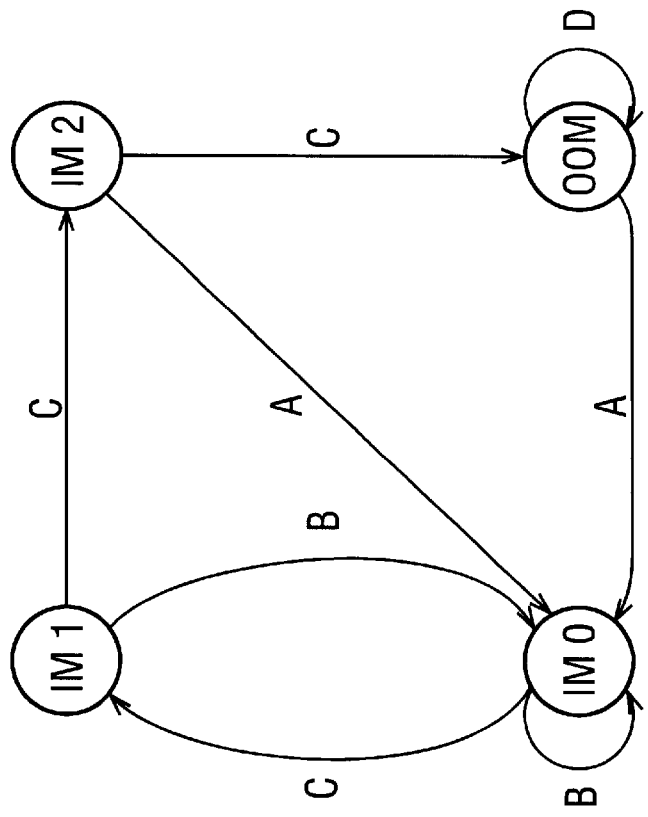
Figure 6:
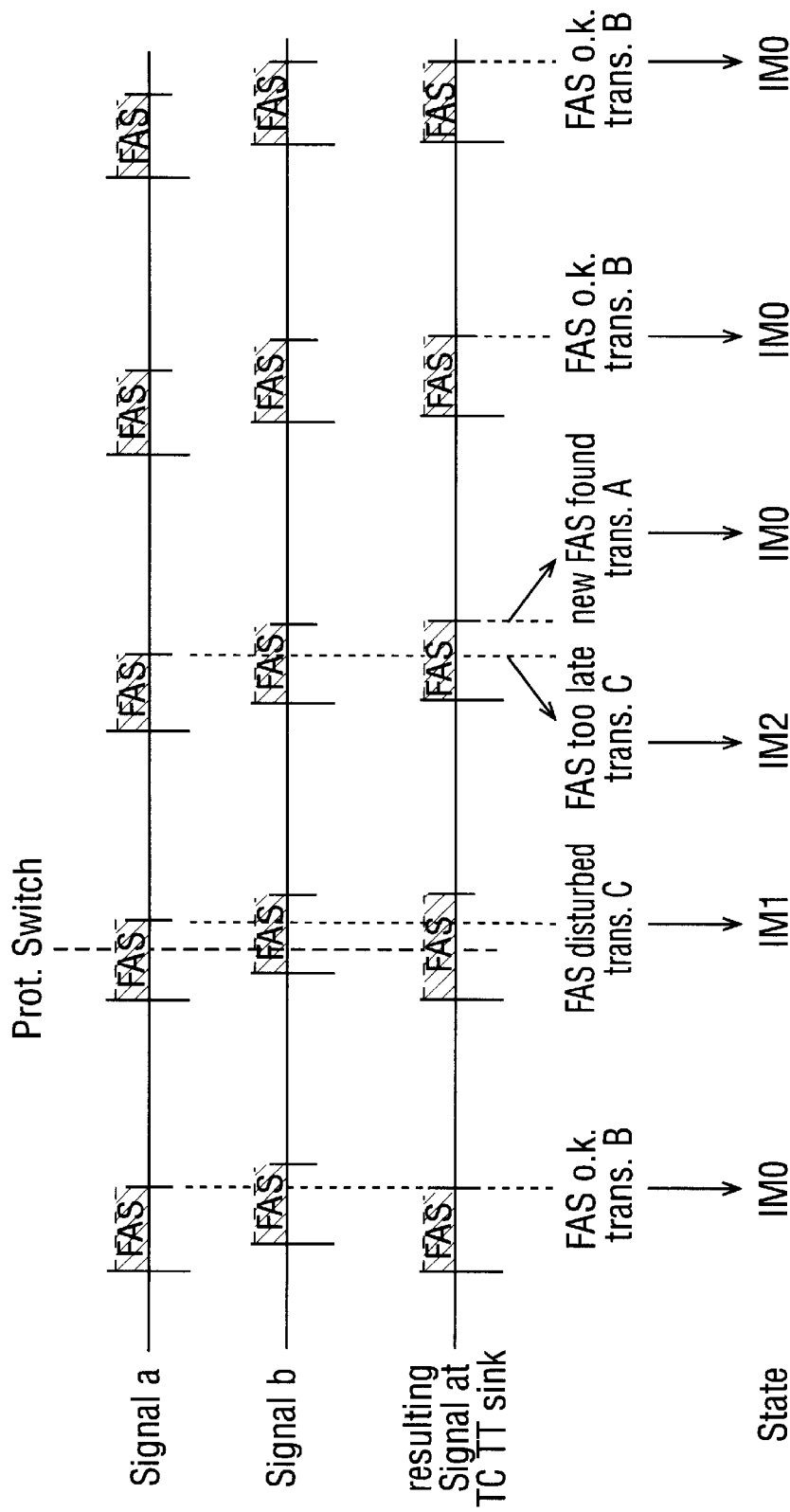

The invention is explained in more detail below and reference is made to the attached drawings in which it is shown in FIG. 1 a network comprising a tandem connection trail with a protection mechanism called "sublayer monitored sub-network connection protection" (SNC/S), FIG. 2 phase relations of two subnetwork connections at the switching point, FIG. 3 state diagram 'Multiframe Alignment Process' as currently implemented, FIG. 4 dependencies between state transitions, FIG. 5 state diagram of an adapted multiframe alignment process according to a first inventive embodiment, FIG. 6 protection switch operation while a frame alignment signal (FAS) overlaps during switching, FIG. 7 N1/N2 byte bit 7 bit 8 tandem connection multiframe structure, FIG. 8 structure of frames #73–76 of the bit 7–bit 8 of a tandem connection multiframe, FIG. 9 block Diagram 'out of multiframe (OOM) Filtering'.

DETAILED DESCRIPTION

The invention is explained below in more detail based on preferred embodiments. However, for a better understanding, a standard configuration of a network containing a tandem connection trail with possible switching is depicted in FIG. 1.

A unidirectional tandem connection trail is established between network element A (NE A) and network element F (NE F), with NE A holding the Tandem Connection source function and NE F holding the Tandem Connection sink function. The sub-network connection between NE A and NE F is protected.

The worker sub-network connection is via NE B-NE C-NE D (signal a), the protection one via NE E (signal b). The protection mechanism is "sublayer monitored sub-network connection protection" (SNC/S) which is based on the result of Tandem Connection Non-Intrusive Monitoring Trail Termination Sink functions for each of the two sub-network connections (SNCs).

In case of a protection switch operation the Tandem Connection Sink function will receive signal b instead of signal a as before.

Data signals which are routed through the network using different routes will experience different run times caused by the transfer delay on the optical fibre or the cable on the one hand and by the processing time in the different network elements on the other. Therefore the two signals will arrive with different phases at a common point (here: input of the protection switch selector at NE F).

It should be noted that 1 km of cable or optical fibre gives about 5 us of transfer delay. In a protected ring architecture, the short route can be between two adjacent nodes, whereas the long route may include all other nodes in the ring. In typical applications the phase difference may be in the range of several SDH/SONET frame lengths. In the following text, only the SDH notation (VC) is used.

FIG. 2 shows the signals a and b with a phase difference T of more than one frame length between the two signals. The signals contain the VC frames ( . . . , x–2, x–1, x, x+1, x+2, . . . ). Switching from a short route to a longer route very likely results in the reception of a number of frames for a 2nd time, whereas switching from a long to a shorter route often causes a loss of a number of frames. This has certain consequences at the tandem connection sink function.

The operation of a tandem connection trail at the tandem connection sink is based on a standardized protocol. This protocol requires to check a frame alignment signal (FAS) contained in the N1/N2 bytes. The frame alignment signal (FAS) is defined as a "1111 1111 1111 1110" bit pattern in frame 1 to 8 of the 76 frames tandem connection multiframe.

The process of checking a multiframe alignment is shown in FIG. 3. The multiframe alignment is found based on searching for the frame alignment signal (FAS) pattern within the bits 7 to 8 of the byte N1/N2. In the In Multiframe (IM) state, i.e. the state of a correct signal transmission, the signal is checked continuously at the presumed multiframe start position for the alignment.

However, the frame alignment is deemed to have been lost (entering Out Of Multiframe (OOM) state) when two consecutive frame alignment signals (FAS) are detected in error. Frame alignment is deemed to be recovered, i.e. entering the In Multiframe (IM) state, when one non-errored frame alignment signal (FAS) is found at any position.

A protection switch operation in front of the tandem connection sink function will likely cause a loss or duplication of N1/N2 bytes at the tandem connection sink due to the different signal delays explained above. This causes the alignment process to leave the In Multiframe state, i.e. to enter an Out Of Multiframe OOM state, as the correct length of the tandem connection multiframe structure is disturbed and the frame alignment signal (FAS) will no longer be found at the presumed multiframe start position. The out of multiframe (OOM) state then is interpreted as Loss of Tandem Connection defect (dLTC), which causes consequent actions like an all-ones insertion. As a consequence the egressing signal is overwritten with all-ones until the IM state is entered again.

FIG. 4 shows the dependencies and time sequences of the generated defect caused by the protection switch. The sequence IM ($T_{IM}$=max. 19 ms/76 ms)→OOM ($T_{OOM}$=max. 9.5 ms/38 ms)→IM needs about $T_{ALL}$=max. 28.5 ms for tandem connection signals based on a 125 microsecond VC frame (VC-4, VC-4-Xc and VC-3) and about $T_{ALL}$=max. 114 ms for tandem connection signals based on a 500 microseconds VC frame (VC-2, VC-12 and VC-11).

This means that the outgoing signal is disturbed again about $T_{IM}$ (max. 19/76 ms) after a protection switch activity that restored traffic for about $T_{OOM}$ (max. 9.5/38 ms). This disturbance would not exist if there would be no tandem connection trail established.

To avoid extended signal disturbances e.g. as the above described ones, it is necessary according to the invention to change the tandem connection sink processes such that data delay differences caused by protection switches will not create or extend traffic interruptions due to a Loss of Tandem Connection defect (dLTC).

With this approach, the inventive improvement is effective mainly in cases of manual or forced protection switches. In those cases the signal interruption caused by the switching action is very short (less than 10 ms) and the multiframe itself was not disturbed before the switching process. In cases in which the multiframe is lost before the switching action is initiated (e.g. SSF, TC-UNEQ) the advantage of the described solutions is smaller.

Improved Multiframe Alignment Processing

In a first embodiment, the multiframe alignment process is changed such that data delay differences caused by switching actions do no longer result in IM→OOM→IM sequences at the multiframe alignment state machine. To achieve this, the state transition B is changed from "FAS found at presumed position" to simply "FAS found". Regardless of its position, every detected frame alignment signal (FAS) is accepted as a valid one, i.e. as a "FAS found" signal according to this inventive embodiment and undue delay of the acceptance of a newly aligned or resynchronized signal transmission is avoided.

Further, an "In Multiframe 2 (IM2)" state is added. This new "In Multiframe" state is necessary to handle a specific switching situation: If the protection switch action happens at a moment when both the old frame alignment signal (FAS) and the new frame alignment signal are received and the new frame alignment signal (FAS) is received later than the old one, the state machine (see FIG. 3) would also enter an out of multiframe (OOM) state without this IM2 state. This situation is shown in FIG. 6. The new processing state diagram is shown in FIG. 5.

The acceptance of every received frame alignment signal (FAS) independent of the multiframe alignment state and the relative position will avoid state transitions like IM→OOM→IM caused by protection switches within the tandem connection. Such disturbances are compelling in the current implementations.

With the improved multiframe alignment processing the new multiframe position after the switching action is accepted immediately. Therefore the out of multiframe (OOM) state is not entered and no associated subsequent actions as e.g. an all-ones insertion are initiated.

According to the invention the signal disturbance caused by the switching action is kept as short as possible.

However, with this implementation, the possibility of a falsely detected frame alignment signal (FAS) is slightly increased but is still acceptable. The N1/N2 byte protocol as defined in the standards is shown in FIGS. 7 and 8. It requests a '0' in the most significant bit of every Tandem Connection Trail Trace Identifier (TC-TTI) byte. Also the last received Tandem Connection multiframe byte contains 6 bits with the reserved value '0'.

To falsely detect a FAS, bit errors must be present in the data signal. There are two conditions under which a false frame alignment signal (FAS) would be detected:

First condition: A CRC-7 checksum of '1111111' in combination with a bit error in the most significant bit of the first TC-TTI byte and a value of '1111110' contained in the other 7 bits of the first TC-TTI byte occurs.

Second condition: Two bit errors in the most significant bits of two consecutive TC-TTI bytes combined with the TC-TTI values of '1111111' and '1111110' contained in bits 2 to 8, of these bytes are received.

However, even if a false frame alignment signal (FAS) would be accepted, the mismatch is corrected immediately after the receipt of the next (correct) frame alignment signal (FAS). No additional error would be detected as the trace identifier would be declared false anyway (due to the necessary bit error for the false FAS).

Out of Multiframe (OOM) Filtering

In another preferred embodiment of the invention the insertion of all ones caused by the out of multiframe (OOM) state is suppressed for a certain time. In this solution the Loss of Tandem Connection (dLTC) defect, which causes the all ones insertion, is not directly derived from the-out of multiframe (OOM) state, as it is state of the art. The out of multiframe (OOM) state is detected as currently defined, (see FIG. 3), but dLTC is only set if out of multiframe (OOM) is active for a certain time interval.

The interval length is configurable from 0 to 3 tandem connection multiframes. If a period of zero multiframes is chosen, the whole algorithm will behave as the current implementations. Any other value bigger than one will suppress the all ones insertion until the out of multiframe (OOM) state was active for the selected interval length.

In case of protection switches there will be transitions like IM→OOM→IM, but the out of multiframe (OOM) state is shorter than 2 TCM multiframes and the consequent action 'all-ones insertion' will therefore be suppressed, because a Loss of Tandem Connection (dLTC) signal won't be set. A block diagram for this solution is shown in FIG. 9.

An advantage of this process versus the first solution is that the bit error immunity is as high as for the currently used process. A disadvantage is that the detection time for Loss of Tandem Connection (dLTC) is increased.

A further inventive improvement is the suspension of the dTIM defect in case of an OOM state. This will prevent that a dTIM defect is detected due to the protection switch action. Therefore there is no extension of the signal interruption caused by the all-ones insertion which is a consequent action to a detected dTIM defect.

What is claimed is:

1. A method of transmitting data in a synchronous hierarchic network system comprising at least a path segment between a first network element and at least a second network element, said method comprising:

establishing a tandem connection monitoring method for monitoring transmission of information over said path segment, and detecting an aligned signal reception or an in multiframe signal transmission state subsequent to an interruption, distortion or switching of the signal transmission path on the basis of a first received frame alignment signal (FAS) value by performing a frame alignment search independent of a presumed position of the frame alignment signal, wherein every detected frame alignment signal (FAS) is accepted as a valid frame alignment signal (FAS).

2. The method of transmitting data according to claim 1 comprising, generating of a further "In Multiframe 2 (IM2)" state signal to handle a switching situation in which a protection switch action happens at a moment when new and old frame alignment signals (FAS) overlap and the new frame alignment signal (FAS) is received later in time than the old frame so as to avoid that the state machine enters an out of multiframe (OOM) state.

3. The method of transmitting data according to one of claim 2, wherein the "In Multiframe 2 (IM2)" state is used to extend the detection period for the new frame alignment of the received signal subsequent to said alteration.

4. The method of transmitting data according to one of claim 1, wherein an out of multiframe (OOM) state is not entered for a certain time interval upon detection thereof.

5. The method of transmitting data according to one of claim 4, wherein no associated standardized subsequent actions are initiated upon initial detection of said OOM state.

6. The method of transmitting data according to one of claim 5, wherein said associated standardized subsequent actions include all-ones insertion.

7. A synchronous hierarchic network system especially adapted for to a data transmission comprising at least a path segment between a first network element and at least a second network element on which a tandem connection monitoring method is established for monitoring information over said path segment, and means for detecting, for reduction of signal interruption due to loss of multiframe alignment, an aligned signal reception or an in multiframe signal transmission state subsequent to an interruption, distortion or switching alteration of the signal transmission path on the basis of the detection of the first received frame alignment signal (FAS) value independent of a presumed position of the frame alignment signal, and means for accepting every received frame alignment signal as a valid frame alignment signal.

8. The synchronous hierarchic network system according to claim 7 comprising means for generating a further "In Multiframe 2 (IM2)" state signal and wherein during the further "In Multiframe 2 (IM2)" state or upon signalling of the further "In Multiframe 2 (IM2)" state signal the detection period for a anew received frame alignment signal (FAS) is extended.

9. A method of transmitting data in a synchronous hierarchic network system comprising at least a path segment between a first network element and at least a second network element, said method comprising:

establishing a tandem connection monitoring method for monitoring transmission of information over said path segment, detecting an aligned signal reception or an in multiframe signal transmission state subsequent to an alteration of the signal transmission path on the basis of a first received frame alignment signal (FAS) value, and generating of a further "In Multiframe 2 (IM2)" state signal to handle a switching situation in which a protection switch action happens at a moment when new and old frame alignment signals (FAS) overlap and the new frame alignment signal (FAS) is received later in time than the old frame so as to avoid that the state machine enters an out of multiframe (OOM) state.

10. The method of transmitting data according to claim 9, wherein the "In Multiframe 2 (IM2)" state is used to extend the detection new frame alignment of the received signal subsequent to said alteration.

* * * * *